No. 733,524. PATENTED JULY 14, 1903.
H. O. WOODBURY.
TROLLEY POLE GUIDE.
APPLICATION FILED OCT. 13, 1902.
NO MODEL. 2 SHEETS—SHEET 1.

Witnesses:
Walter E. Lombard
Nathan C. Lombard 2nd

Inventor:
Hezekiah O. Woodbury,
by Alban Andrew
Atty.

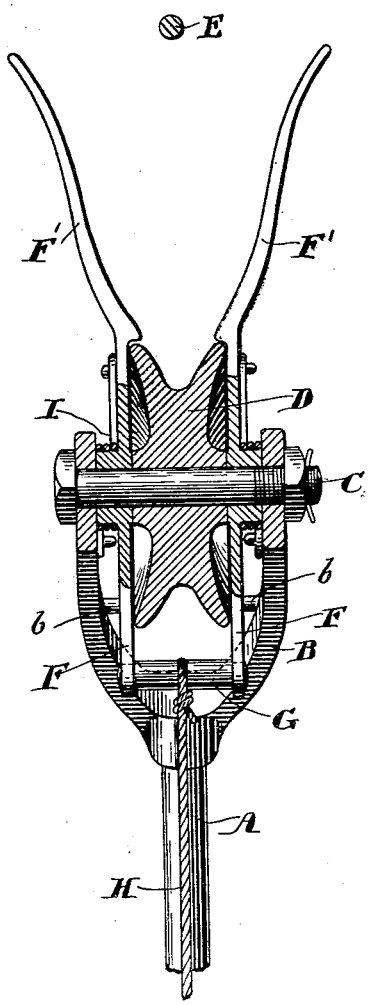

No. 733,524.                                             Patented July 14, 1903.

UNITED STATES PATENT OFFICE.

HEZEKIAH O. WOODBURY, OF BEVERLY, MASSACHUSETTS, ASSIGNOR OF TWO-THIRDS TO EDWARD F. SANDERSON AND ROBERT W. BLAISDELL, OF BEVERLY, MASSACHUSETTS.

TROLLEY-POLE GUIDE.

SPECIFICATION forming part of Letters Patent No. 733,524, dated July 14, 1903.

Application filed October 13, 1902. Serial No. 127,095. (No model.)

*To all whom it may concern:*

Be it known that I, HEZEKIAH O. WOODBURY, a citizen of the United States, and a resident of Beverly, in the county of Essex and State of Massachusetts, have invented certain new and useful Improvements in Trolley-Pole Guides, of which the following is a specification.

This invention relates to a new and useful device for readily and expeditiously guiding the trolley in position relative to the overhead line-wire in case the said trolley should suddenly jump the wire, as is frequently the case on electrically-operated tram-cars, in which a trolley journaled on the end of a trolley pole or arm is held in frictional connection with the overhead line-wire. With this object in view my invention is carried out as follows, reference being had to the accompanying drawings, where—

Figure 1:
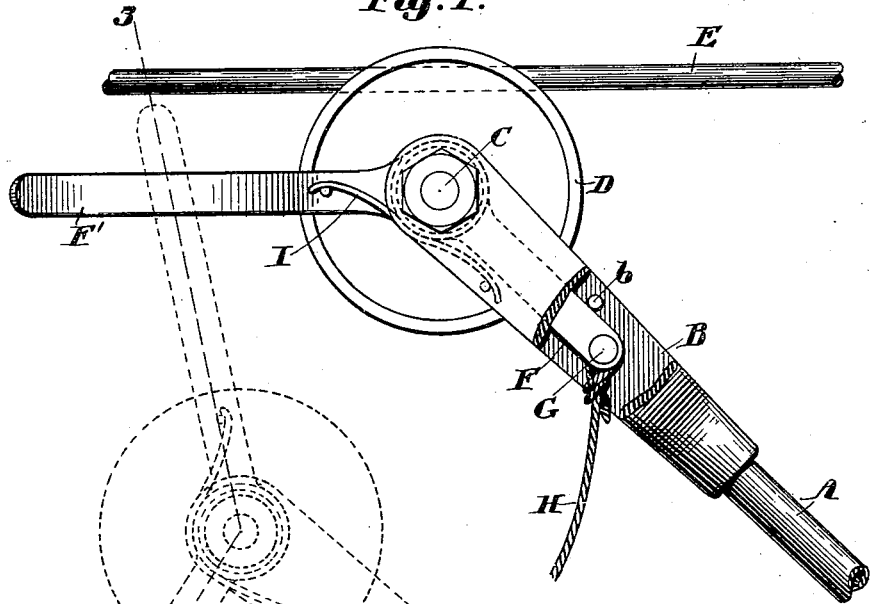
Figure 2:
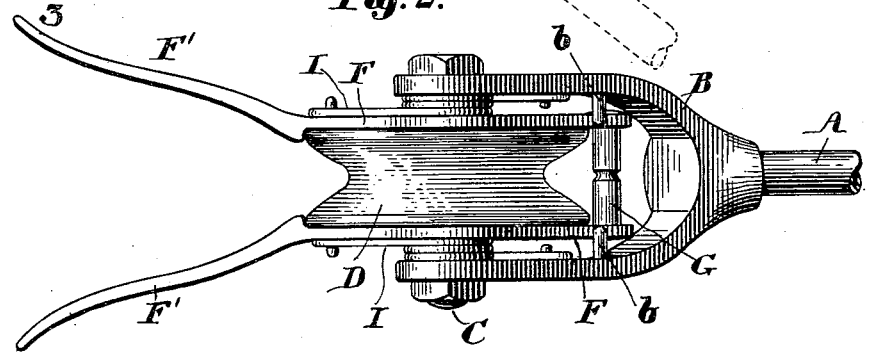

Figure 1 is a side elevation of a trolley-pole provided with my invention, showing in full lines the trolley-pole, trolley, and guide in their normal positions and showing in dotted lines the trolley in the act of being guided onto the wire. Fig. 2 is a top plan view of Fig. 1, and Fig. 3 is a cross-section on the line 3 3 shown in Fig. 1.

Similar letters refer to similar parts wherever they occur on the different parts of the drawings.

In the drawings, A represents the trolley-pole of an electrically-operated tram-car, and B represents the upper forked head of said pole, to which is attached a pin or bolt C, on which is loosely journaled the trolley D, as is common in devices of this kind.

E is the overhead line-wire, as usual, in contact with which the trolley is normally held, as shown in full lines in Fig. 1.

Upon the pin or bolt C is pivoted on each side of the trolley D a short lever F, integral with which is made an outwardly-flaring guide wing or projection F', as shown.

To the inner ends of the arms F F is suitably connected a bail or cross-piece G, and to the latter is connected the cord-pull H, by means of which the trolley is guided onto the line-wire in case the trolley should accidentally jump said wire or it should be desired to reverse the position of the trolley-pole to propel the car in the opposite direction.

The outwardly-flaring wings or projections F' F' are normally held in the position shown in full lines in Fig. 1 by the influence of preferably coiled springs I I, encircling the bolt C and having their free ends suitably connected or attached to the projections F' and head B of the trolley-pole, as shown.

b is a lateral pin or stop projection on the forked head B, which serves as a stop against the levers F F for holding them by the springs I I, when the tension on the cord H is released, in the normal position. (Shown in full lines in Fig. 1.) In such normal position of the levers F F their outwardly-flaring guide projections F' F' are held by the springs I I in a horizontal position below the line-wire E, so as to prevent their coming in contact with overhead cross or stay wires or other overhead structures during the propulsion of the car.

The operation is as follows: In case the trolley should jump the line-wire or it should be desired to reverse the position of the trolley-pole it is only necessary for the conductor or person in charge to pull downward on the cord H sufficiently to cause the trolley to be pulled a short distance below the line-wire, and in so doing the flaring guide-arms F' F' are caused to swing upward to the position shown in full lines in Fig. 3 and dotted lines in Fig. 1. To place the trolley in contact with the wire, it is only necessary to slightly release the tension or hold on the cord H, when the trolley can quickly be guided into operative position by the flaring arms F' F'. As soon as the trolley is on the wire the operator releases entirely his hold on the cord H, when the guide-arms F' F' are instantly and automatically returned to their normal positions by the influence of the springs I I, as shown in Figs. 1 and 2.

The device is very simple in construction, it can readily be applied to trolley-poles of any well-known size or shape, and it saves a great deal of time and annoyance in placing a trolley on the line-wire in case the trolley should jump the wire or in case it should be desired to reverse the position of the trolley-pole.

Having thus fully described the nature, construction, and operation of my invention, I wish to secure by Letters Patent and claim—

The combination with a trolley-pole, of a U-shaped bracket fixed on the end of said pole, a trolley-wheel journaled in the ends of said bracket, a trolley-guide comprising two bell-crank levers journaled intermediate their ends on the pivot of the trolley-wheel and connected together at their forward or lower ends by a rod and diverging from one another at their opposite ends, springs coiled about the pivot of the trolley-wheel and bearing downwardly against the rear ends of said bell-crank levers to normally hold the latter depressed, inwardly-projecting pins formed on the inner sides of the U-shaped bracket and operating to support the ends of the bell-crank levers in their depressed or inoperative position, and a cable connected to the cross-rod by means of which said bell-crank levers may be thrown into an upright position to engage the trolley-wires, substantially as described.

In testimony whereof I have affixed my signature in presence of two witnesses.

HEZEKIAH O. WOODBURY.

Witnesses:
ALBAN ANDRÉN,
THEKLA ANDRÉN.